United States Patent [19]

Heimsch

[11] 4,293,668

[45] Oct. 6, 1981

[54] REFINING OLEFIN/MALEIC ACID COPOLYMERS BY EXTRACTION WITH ALKANES

[75] Inventor: Robert A. Heimsch, St. Louis, Mo.

[73] Assignee: Monsanto Company, St. Louis, Mo.

[21] Appl. No.: 94,417

[22] Filed: Dec. 26, 1979

[51] Int. Cl.³ ............................ C08F 8/42; C08F 6/10; C08F 6/00
[52] U.S. Cl. ...................................... 525/369; 424/78; 525/328; 525/355; 528/498
[58] Field of Search ................ 528/498; 525/328, 369, 525/355

[56] References Cited

U.S. PATENT DOCUMENTS

| 3,318,851 | 5/1967 | Nicholls | 526/260 |
| 3,461,108 | 8/1969 | Heilman | 528/498 |
| 3,560,456 | 2/1971 | Hazen | 526/272 |
| 4,121,026 | 10/1978 | Cheng | 526/272 |
| 4,157,431 | 6/1979 | Fields | 525/328 |

*Primary Examiner*—C. A. Henderson
*Attorney, Agent, or Firm*—Joseph D. Kennedy; James W. Williams, Jr.

[57] ABSTRACT

Olefin/maleic acid copolymer is refined to pharmaceutical quality by extraction of contaminants with hexane or heptane.

8 Claims, No Drawings

4,293,668

REFINING OLEFIN/MALEIC ACID COPOLYMERS BY EXTRACTION WITH ALKANES

The present invention concerns a method of isolating and purifying olefin/maleic acid copolymers and is particularly concerned with an extraction procedure to remove low molecular weight and monomeric materials from such copolymers. The polymers are provided in a form substantially free from low molecular weight materials and suitable for medicinal use.

BACKGROUND OF THE INVENTION

Olefin/maleic acid copolymers have been shown effective as agents for controlling blood cholesterol levels as described in Fields and Johnson U.S. Pat. No. RE 29,652 issued May 30, 1978. Olefin/maleic copolymers can be prepared in the anhydride form by the polymerization methods described in the aforesaid patent or in the patents there cited, for example, Fields and Johnson U.S. Pat. No. 3,340,680. Such polymerization methods frequently utilize a solvent for the reaction which dissolves the monomers, but not the resulting copolymer, so that the copolymer precipitates. This is an effective method of preparing and isolating polymer for normal industrial uses, although with higher olefins it may be difficult to obtain the polymer in readily filterable form. However polymer obtained in such procedures generally contains substantial amounts of residual monomers and low molecular weight polymer materials. A Hazen and Heilman U.S. Pat. No. 3,560,456 describes a method in which a copolymer of maleic anhydride and an olefin of 16 to 18 carbon atoms is precipitated from solution by propyl alcohol in order to have the polymer in particulate form for filtration. The procedure is useful but the product still contains substantial amounts of low molecular weight material and some residual amounts of esterified polymer. The product obtained by the described procedure can, if desired, be utilized for further refinement in accord with the present invention.

SUMMARY OF THE INVENTION

The present invention involves a procedure for refining olefin/maleic acid copolymer by extracting materials therefrom with designated hydrocarbon or other liquids. The invention is also concerned with the process for hydrolyzing olefin/maleic anhydride copolymers, followed by various extraction-refining, filtration, washing, solution-filtration and drying steps to obtain refined olefin/maleic acid copolymer.

DETAILED DESCRIPTION OF THE INVENTION

Olefin/maleic copolymer polymerization product generally contains residual monomers and some low molecular weight fractions. It is desirable to remove those materials from product intended for medicinal use. While olefin/maleic acid copolymers as a class have some useful properties in common and are of interest in the present invention, the higher olefin/maleic acid copolymers are of particular interest. The higher olefins have a longer hydrocarbon chain and tend to give the copolymers more lipophilic properties, making them more useful as agents to control blood cholesterol levels. The hydrocarbon chain also influences solubility properties and effectiveness of refinement procedures as described herein. The copolymers of particular interest herein will generally be of olefins of at least 8 carbon atoms, often of about 10 to about 22 or more carbon atoms. The procedures herein are particularly directed for use with such copolymers of such olefins with maleic acid. While various derivatives of the maleic moiety are known and may be useful, the acid form has properties especially appropriate for the extraction procedures herein. The acid form can conveniently be obtained by hydrolysis of the anhydride form, but the olefin/maleic acid copolymer is appropriate for use herein aside from how obtained. It will be recognized, of course, that high molecular weight polymers are not generally completely homogeneous materials, and may vary somewhat in functional groups, as well as in structure and molecular weight. The acid form of the copolymer exhibits a tendency to convert to the anhydride, and the copolymers utilized herein, as well as the refined product, generally contain small amounts of maleic anhydride moiety, which may range up to 20 to 25% or so of the maleic moieties in the polymer. It will generally be preferred to work with and produce product with about 5 to 10% or so anhydride content.

The procedures herein are intended primarily for removal of low molecular weight polymers, residual olefin or maleic monomer, or other non-polymeric material. In medicinal use, the low molecular weight or monomeric materials could have a different physiological effect than high molecular weight polymer. The high molecular weight polymer is non-systemic when administered orally, i.e., not absorbed from the gastrointestinal tract. The degree of absorbability of the monomers and low molecular weight polymers have not been determined precisely, and no limits have been established for their presence in pharmaceutical grade polymer. However, the procedures described herein produce polymer which is acceptable from a toxicity standpoint in animal tests. The monomer content can be reduced to the parts per million range, such as less than 500 ppm, and often much lower, e.g. less than 10 ppm maleic acid, and the low molecular weight polymers can be reduced to circa no more than 0.1% by weight below molecular weight of 2000 as measured by gel permeation chromatography, or even less if desired.

The high molecular weight α-olefin/maleic acid copolymers utilized in and refined by the present invention are essentially insoluble in the solvents utilized under normal temperature conditins. Solubility is a matter of degree but the high molecular weight polymers themselves have only minimal solubility and little tendency to soften in the solvents at 25° C. or lower, while showing some softening at somewhat higher temperatures. The low molecular weight olefin/maleic acid copolymers, which it is desired to remove have appreciable solubility so as to be removed along with monomeric materials by extraction procedures as described herein.

The extracting solvents used herein are acyclic alkanes of 5 to 8 carbon atoms. It is preferred to utilize n-alkanes, particularly n-hexane and n-heptane. Industrial grade alkanes which are low in unsaturation and aromatics are suitable for use. Mixtures of any two or more of the individual alkanes can be employed.

The present invention involves treatment of polymer in a solvent extraction procedure to remove low molecular weight polymer and monomer components therefrom. The extraction utilized is contemplated as involving contact of the liquid solvent with the solid polymer sufficient for permeation through polymer particles with removal of a fairly high proportion of the materials soluble in the solvent, generally involving contact for extended times with provision for relative movement of the polymer and solvent, as by circulation, agitation, counter current flow, immersion with stirring, etc., and often with the extracting solvent being utilized in much higher volume than the polymer. The extraction is generally carried out at ambient temperature or lower. However, somewhat higher temperatures can be utilized, but it is desirable to avoid temperatures so high as to cause softening of the polymer with resulting difficulties in filtration and separation of the solvent. The extraction will generally involve treatment of polymer with the extracting solvent for a matter of hours, possibly involving several extractions for shorter periods of time, for example two or three extractions. The duration of the individual extractions can vary, but each may be greater than one-half hour, for example about 1 to 3 hours or so. After the contacting treatment in the individual extraction the solvent is removed by filtration or centrifuging, with washing, generally with lesser amounts of extraction solvent, so as to remove occluded solvent and obtain maximum effect of the solvent extraction.

The amount of extracting liquid can vary considerably, depending on the contacting method employed, but will ordinarily be at least equal in weight to the polymer and usually 2 or 3 up to 5 or so times the weight of the polymer.

The recovery of polymer in the present extraction procedure will generally be fairly good, with some variation depending on the amount of monomeric olefin in the polymer utilized. Recoveries better than 80% are expected, usually better than 90%, and will approach 95% if the monomer content is around 5%. Ordinarily there is very little loss of the high molecular weight polymer itself, so the recovery will generally approach the original amount of polymer, less the low molecular weight and monomeric materials removed.

In the extraction it is desirable that the polymer particles retain their identity and not pack down or coalesce with adjacent particles, and having the particles dispersed in a large volume aids in this regard. It is desirable that the extracting solvent be able to move by and around the particles with facility. Filtration or centrifuging is utilized to remove the extracting solvent, containing dissolved contaminants, from the polymer. However, the use of a filter or centrifuge alone for the extraction is not recommended because of the limited movement and contact with the solvent in such procedures.

After filtration or centrifuging, or as a part thereof, the polymer can be washed with an additional portion of extracting solvent. The washing involves enough contact to remove occluded solvent or soluble materials on the surface of the polymer particles, but the contacting is generally not sufficient to effect the desired degree of removal from the interior of the polymer particles.

The olefin-maleic copolymer is utilized in particulate form for the extraction. The particulate form can in some cases by obtained from the polymerization and isolation of the copolymer, particularly if a precipitation or similar procedure causes production of particles of the desired size range. Alternatively the polymer can be broken and ground by appropriate mechanical procedures, as in a hammer mill. It is desirable to have the particles sufficiently small to permit convenient permeation therethrough by the extracting solvents, but not so small as to make handling and filtration unnecessarily difficult in the extraction. The polymer for the extraction procedure is preferably of size in the range of about 20 to about 100 mesh, i.e. to pass through a sieve with 840 micron openings but not through a sieve with 150 micron openings. The sieve openings will determine the maximum size of the particles. While there will often be some variation of individual particles from an indicated range, about 90% of so will desirably be in the 20 to 100 mesh range, and then around 65% are likely to be in the 40 to 80 mesh range, i.e. to have maximum particle sizes of about 360 to 175 microns.

In the polymer refining it is desirable to have a step in which the polymer is placed in solution and filtered, for the purpose of removing any solid contaminants such as dirt, metal particles and the like. A convenient procedure involves dissolving the polymer in aqueous alkaline solution, filtering, and then neutralizing the filtrate with acid to precipitate the polymer which is then recovered by filtration. If this procedure were carried out on the anhydride form of the polymer, it would also serve as a hydrolysis step. However, it has been found that precipitation from alkaline solution with acid produces very fine size particles which tend to swell and cause difficulty in subsequent alkane extraction and filtration procedures. Therefore it is appropriate to carry out the extraction procedure on the acid form of the polymer, prior to the alkaline solution and clarification procedure. Of course, if the acid precipitation procedure is modified or other means used to obtain suitable particle size, the procedure can then precede the solvent extraction procedure and also serve as a procedure to convert the anhydride form of the polymer to the acid form.

The polymer is obtained from usual polymerization and recovery procedures may contain 3 to 5% or so by weight olefin monomer. This is removed in extraction procedures as taught herein along with low molecular weight polymer.

The polymers utilized in the present invention ordinarily have a fairly broad molecular weight distribution as is typical of polymers formed by free radical polymerization. Typical samples may have weight average ($M_w$) molecular weights around 55,000 to 65,000 and number average molecular weights ($M_n$) around 24,000 to 28,000 Daltons. These molecular weight characterizations, and Mw/Mn which is a measure of heterogenity, have some value, but are not specifically designed to measure the amount of low molecular weight, e.g. in the range of up to 1000 or 2000 Mw, polymers which are removed in the present process. Aside from the assumed value of removing such low molecular weight species, there is no concern over the distribution of the molecular weights, or about the presence of particular molecular weights, whether well below Mw 50,000, or far above Mw 65,000 or 100,000 or so. The polymers are considered effective and suitable for use over broad ranges, even at extremely high molecular weights over a million or more, and particular ranges are given for illustration. Typical polymer has Mw over 50,000 and Mn over 22,000.

The polymer utilized herein may have about 5% residual olefin monomers, with very little maleic acid, and ordinarily no more than 0.3% by weight of molecules of less than 2000 molecular weight. After refining as described herein, the monomer content will typically be no more than 400 parts per million α-olefin, possibly in the range of 30 to 200 parts per million, no more than 20 parts per million maleic acid, and less than 0.1% by weight of molecules under 2000 molecular weight with none measured under 1000 molecular weight, and it is possible to reach nominal measurements of zero molecules under 2000. The measurements may involve an error of ±10 or 15% in these ranges. In addition to removing monomers and low molecular weight materials, the procedures herein also unavoidably remove some higher molecular weight or anhydride materials, but the losses are in acceptable ranges.

The process of the present invention is capable of producing pharmaceutical grade higher olefin/maleic acid copolymer with no more than 20% anhydride content, no more than 400 parts per million α-olefin, no more than 20 parts per million maleic acid, less than 0.1% by weight of molecules less than 2000 molecular weight, and preferably with particle sizes with at least 70% of maximum no greater than 0.043 mm. Since the polymer results from a free radical polymerization, it has the heterogeneous molecular weight distribution typical thereof, except for removal of lower molecular weight materials.

EXAMPLE

A 526 gram amount of octadecene-1/maleic anhydride copolymer was hydrolyzed in 1578 ml. of water containing 16 grams of salt for 22 hours at 45°–50° C. The polymer was separated by filtration and dried at 50° C. under vacuum to obtain 561 grams of the acid form of the polymer. Analysis indicated residual anhydride content of 18.5%, water content 1.6–1.7%, weight average molecular weight ($M_w$), 55,700 and number average molecular weight ($M_n$), 22,200. The polymer had 4.9% olefin monomer, and less than 0.18% polymer of less than 2000 $M_w$. A 150 gram sample of the crude acid polymer was placed in a flask with 450 grams n-heptane and stirred at 22° C. for 3 hours. The material was filtered on a Buchner funnel and washed with 150 grams of heptane on the funnel. A sample of polymer was taken, and the filtrate was distilled to obtain a residue for analysis. The remaining product was then used to repeat the extraction procedure two more times, with sampling and isolation from filtrate each time. Results are summarized in Table 1.

TABLE 1

| Extraction No | Heptane Extraction | | | | |
|---|---|---|---|---|---|
| | % of Polymer Extracted | Polymer Product | | | |
| | | $M_w$ | $M_n$ | Olefin Content | % <2000 $M_w$ |
| 1 | 5.7 | 54,800 | 24,000 | 18 ppm | 0.03 |
| 2 | 0.5 | 55,300 | 24,100 | 22 ppm | <0.01 |
| 3 | 0.5 | 54,700 | 24,400 | 22 ppm | <0.01 |

EXAMPLE 2

The extraction procedure of Example 1 was repeated, but with hexane as solvent in place of heptane, and performing only two extractions. The results are summarized in Table 2.

TABLE 2

| Extraction No. | Hexane Extraction | | | | |
|---|---|---|---|---|---|
| | % Polymer Extracted | $M_w$ | $M_n$ | Olefin Content | % <2000 $M_w$ |
| 1 | 7 | 59,100 | 23,900 | 47 ppm | 0.05 |
| 2 | 0.3 | 60,900 | 25,100 | 46 ppm | <0.01 |

The following illustrates a procedure which can be utilized in carrying out the present invention, starting with crude anhydride copolymer.

A 100 lb. portion of octadecene-1/maleic anhydride copolymer is hydrolyzed with 300 lbs. water containing 2 lbs. of sodium chloride at 60° C., employing a stirred vessel under nitrogen. The extent of conversion can be monitored by infra red, with the usual time being 18–24 hours for 90% conversion. The slurry is cooled to 30° C. and the polymer separated by centrifuge. The polymer is then dried at 45° C. under vacuum. The polymer is then stirred with 300 lbs. hydrocarbon (hexane or heptane) for about 2 hours at 25° C., separated by centrifuge, and washed on the centrifuge with 100 lbs hydrocarbon. The stirring with hydrocarbon, centrifuging and washing steps are then repeated one or two times. The polymer is then dissolved in 850 lbs. water containing 15 lbs. NaOH by heating to 85° C. for about two hours. Residual hydrocarbon may be removed from the polymer solution by distillation. The polymer solution is filtered to remove extraneous solids, and acidified by addition to 13.8 lbs. HCl in 25 lbs water, precipitating the polymer in acid form. The polymer is separated by centrifuge and washed with 100 lbs. water on the centrifuge. The polymer is then slurried with 400 lbs. water for 2 hours at 25° C. centrifuged with washing with an additional 200 lbs. water, dried and ground to desired size.

Centrifuging is used for separations in the described procedure. However, other types of filtration can be used, as on a filter press, with washing on the filter.

For further discussion of applicable procedures for handling the polymers herein and desirable properties of the pharmaceutical grade polymer product, reference is made to U.S. Pat. No. 4,166,900 issued Sept. 4, 1979 to Robert A. Heimsch and John H. Johnson, which is incorporated herein by reference; the stated patent utilizes dichloroethane in washing and solution-precipitation procedures for refining olefin/maleic acid copolymer. The hydrolysis, centrifuging and filtration procedures described therein are generally applicable to the present process. The process described in the patent is effective. However the present process has potential cost advantages with regard to solvent recovery. In addition the potential health problems in the use of a halogenated solvent such as dichloroethane make it desirable to have an alternate process.

What is claimed is:

1. A method of refining octadecene-1/maleic acid copolymer which comprises extracting monomeric and low molecular weight polymer material from such copolymer in a procedure involving contacting the copolymer in the form of particles in the range of about 20 to about 100 mesh with liquid alkane having 5 to 8 carbon atoms for an extended period of time sufficient for the alkane to permeate through copolymer particles and extract such material, and separating the alkane from the copolymer, with the resulting copolymer having less than 0.1% of its molecules of less than 2000 molecular weight and no more than 400 parts per million of monomeric olefin.

2. The method of claim 1 in which the copolymer was obtained by hydrolysis of the corresponding anhydride copolymer, and following the alkane extraction, the polymer product was dissolved in aqueous caustic solution, filtered, precipitated by acidification, washed with water, and dried.

3. The method of claim 1 in which liquid alkane is forced to flow through a bed of copolymer particles for an extended period of time.

4. A method of refining octadecene-1/maleic acid copolymer which comprises extracting monomeric and low molecular weight polymeric material from such copolymer, in a procedure involving contacting the copolymer in the form of particles in the range of about 20 to about 100 mesh for at least one hour with liquid alkane having 5 to 8 carbon atoms, the time being sufficient to extract such material, and in which the resulting polymer product has less than 0.1% of its molecules of less than 2000 molecular weight, no more than 400 parts per million of monomeric olefin and no more than 20 parts per million of maleic acid.

5. The method of claim 4 in which the copolymer was obtained by hydrolysis of the corresponding anhydride copolymer, and following the alkane extraction, the polymer product was dissolved in aqueous caustic solution, filtered, precipitated by acidification, washed with water, and dried.

6. The method of claim 1 in which the alkane is n-heptane.

7. The method of claim 1 in which the alkane is n-hexane.

8. The method of claim 1 in which the alkane is n-heptane.

* * * * *